(12) United States Patent
Shah et al.

(10) Patent No.: US 7,788,694 B2
(45) Date of Patent: Aug. 31, 2010

(54) MULTIPLE DWELLING UNIT SATELLITE TELEVISION DELIVERY SYSTEM

(75) Inventors: Dipak M. Shah, Westminster, CA (US); John L. Norin, Hawthorne, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 285 days.

(21) Appl. No.: 11/523,218

(22) Filed: Sep. 18, 2006

(65) Prior Publication Data

US 2007/0136765 A1 Jun. 14, 2007

(51) Int. Cl.
*H04N 7/20* (2006.01)
*H04N 7/18* (2006.01)

(52) U.S. Cl. .......................................... 725/71; 725/78

(58) Field of Classification Search .................... 725/71, 725/74, 78
See application file for complete search history.

(56) References Cited

U.S. PATENT DOCUMENTS

| | | | | |
|---|---|---|---|---|
| 5,920,239 | A * | 7/1999 | Hardy et al. ................. | 333/100 |
| 6,486,907 | B1 * | 11/2002 | Farber et al. ................. | 725/78 |
| 6,588,017 | B1 * | 7/2003 | Calderone ................... | 725/120 |
| 7,130,576 | B1 * | 10/2006 | Gurantz et al. ............. | 455/3.02 |
| 7,263,713 | B2 * | 8/2007 | Oishi et al. ................. | 725/117 |
| 7,352,991 | B2 * | 4/2008 | Novak et al. ............... | 455/3.02 |
| 2003/0140345 | A1 * | 7/2003 | Fisk et al. .................... | 725/78 |
| 2004/0060074 | A1 * | 3/2004 | Basawapatna et al. ...... | 725/131 |
| 2004/0252243 | A1 * | 12/2004 | Stewart ...................... | 348/725 |
| 2005/0190777 | A1 * | 9/2005 | Hess et al. ................... | 370/401 |
| 2005/0193419 | A1 * | 9/2005 | Lindstrom et al. ........... | 725/71 |
| 2007/0072566 | A1 * | 3/2007 | Taira et al. ............... | 455/127.1 |

FOREIGN PATENT DOCUMENTS

EP    1347644     9/2003
WO   WO 98/22992   5/1998

* cited by examiner

*Primary Examiner*—John W Miller
*Assistant Examiner*—Chris Parry

(57) ABSTRACT

Systems for delivering satellite signals to multiple dwelling units (MDUs). A system in accordance with the present invention comprises an antenna for receiving the satellite signals, a conversion unit, coupled to the antenna, for stacking the satellite signals onto a single cable, a distribution unit, coupled to the conversion unit, wherein the distribution unit distributes the stacked satellite signal to a plurality of outputs, and at least one customer device, coupled to an output of the plurality of outputs, wherein each unit in the MDU uses the customer device to destack the stacked satellite signals for delivery to a receiver.

15 Claims, 13 Drawing Sheets

MULTIPLE DWELLING UNIT SATELLITE TELEVISION DELIVERY SYSTEM

BACKGROUND OF THE INVENTION

1. Field of the Invention

The present invention relates generally to a satellite receiver system and in particular, to a system architecture for control and data signal distribution on coaxial cable.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1A illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz.

Future satellites will likely broadcast in the Ka-band of frequencies, i.e., 18-40 GHz, but typically 20-30 GHz. For example, satellite 122 is at 99 degrees, satellite 124 is at 103 degrees, satellite 126 is at 95 degrees, and satellite 128 is at 72.5 degrees. Satellites 122 and 124 are typically Ka-band satellites; however, other orbital slots can be used at Ka-band without departing from the scope of the present invention. Satellite 128 at 72.5 degrees is typically used for local programming, via spot beams that serve different geographic areas through frequency reuse and/or geographic diversity to allow the antenna beams to service different geographical areas.

FIG. 1B illustrates a multiple dwelling unit in a typical urban setting.

Multiple dwelling unit (MDU) 130 is adjacent to MDU 132 and diagonally opposed to MDU 134. A given dwelling unit 136 in MDU 130 is shown for illustrative purposes. If satellite signals 120 are arriving from direction 138, then dwelling unit 130 can mount an ODU 108 facing direction 138 and potentially receive satellite signals 120. However, the majority of the dwelling units in MDU 132 and 134 will not have clear access to direction 138, and, as such, will not have access to satellite signals 120. Further, if satellite signals 120 are incident from direction 140, then dwelling unit 136 will not have access to satellite signals 120. This problem also affects off-air television signals; an antenna for dwelling unit 136 will be shadowed by not only MDU's 132 and 134, but by MDU 130 depending on where the off-air signal transmitter is located with respect to MDU 130 and dwelling unit 132. In essence, even if dwelling unit 136 has a complete view of the southern sky, other dwelling units in MDU 130 will not, which will eliminate or seriously degrade the reception and use of satellite signals 120 in those units.

FIG. 2 illustrates a typical ODU of the related art.

ODU 108 typically uses reflector dish 222 and feedhorn assembly 224 to receive and direct downlink signals 120 onto feedhorn assembly 224. Reflector dish 222 and feedhorn assembly 224 are typically mounted on bracket 226 and attached to a structure for stable mounting. Feedhorn assembly 224 typically comprises one or more Low Noise Block converters 228, which are connected via wires or coaxial cables to a multiswitch, which can be located within feedhorn assembly 124, elsewhere on the ODU 108, or within house 110. LNBs typically downconvert the FSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 224 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 228 can only receive one polarization at time, so by aligning polarizations between the downlink polarization and the LNB 228 polarization, downlink signals 120 can be selectively filtered out from traveling through the system 100 to each IRD 112A-D.

IRD's 112A-D currently use a one-way communications system to control the multiswitch. Each IRD 112A-D has a dedicated cable 224 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the satA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13VDC without the 22 kHz tone would select one port; 13VDC with the 22 kHz tone would select another port of the multiswitch, etc. There can also be a modulated tone, typically a 22 kHz tone, where the modulation schema can select one of any number of inputs based on the modulation scheme.

To reduce the cost of the ODU 108, outputs of the Ka-band LNBs 128 present in the ODU 108 can be combined, or "stacked," depending on the ODU 108 design. The stacking of the LNB 228 outputs occurs after the LNB has received and downconverted the input signal. This allows for multiple polarizations, one from each satellite 102-106, to pass through each LNB 228. So one LNB 228 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the LNBs 228 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, each LNB 228 can deliver the signals from the Ku-band, the A band Ka-band, and the B band Ka-band signals for a given polarization to the multiswitch. However, current IRD 112 and system 100 designs cannot tune across this entire frequency band, which limits the usefulness of this stacking feature.

By stacking the LNB 228 inputs as described above, each LNB 228 typically delivers 48 transponders of information to the multiswitch, but some LNBs 228 can deliver more or less in blocks of various size. The multiswitch allows each output of the multiswitch to receive every LNB 228 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120.

Further, the installation described above is designed for installation in a single residence, rather than in an apartment building or other large structure. Multiple Dwelling Units (MDUs), e.g., an apartment building, hotel, etc., for some configurations may be able to have their own ODU 108; however, many MDUs may not be able to have an ODU 108 installed for each unit. For example, an apartment building may not be able to have an ODU 108 installed for some apartments because the ODU 108 cannot be properly pointed at satellites 102-106. Hotels may also not be able to install ODUs 108 for every room, for pointing and/or billing reasons.

It can be seen, then, that there is a need in the art for a satellite broadcast system that can be expanded to include MDUs.

SUMMARY OF THE INVENTION

To minimize the limitations in the prior art, and to minimize other limitations that will become apparent upon reading and understanding the present specification, the present invention discloses systems for delivering satellite signals to multiple dwelling units (MDUs). A system in accordance with the present invention comprises an antenna for receiving the satellite signals, a conversion unit, coupled to the antenna, for stacking the satellite signals onto a single cable, a distribution unit, coupled to the conversion unit, wherein the distribution unit distributes the stacked satellite signal to a plurality of outputs, and at least one customer device, coupled to an output of the plurality of outputs, wherein each unit in the MDU uses the customer device to destack the stacked satellite signals for delivery to a receiver.

Such a system optionally also comprises the at least one customer device selectively delivers the destacked satellite signal to a plurality of receivers within the MDU, a second conversion unit, coupled to the conversion unit, and a second distribution unit, coupled to the second conversion unit, wherein the second conversion unit stacks the satellite signals, and the second distribution unit provide the satellite signals stacked by the second conversion unit to a second plurality of outputs, the conversion unit further receiving additional signals, comprising off-air television signals and internet signals.

An alternative system in accordance with the present invention comprises an antenna for receiving the satellite signals, a conversion unit, coupled to the antenna, for stacking the received satellite signals onto a single cable, a distribution unit, coupled to the conversion unit, wherein the distribution unit distributes the stacked satellite signal to a plurality of outputs, each of the plurality of outputs comprising a single output cable, a plurality of customer devices, wherein the customer devices are coupled to the plurality of single output cables in a respective manner, wherein the customer devices destack the stacked satellite signals, and a receiver, coupled to the customer device, for decoding the destacked satellite signals.

Such a system optionally includes the customer device selectively delivering the destacked satellite signal to a plurality of receivers within the MDU based on commands received from the receiver, a second conversion unit, coupled to the conversion unit, and a second distribution unit, coupled to the second conversion unit, the second conversion unit stacking the satellite signals, and the second distribution unit provide the satellite signals stacked by the second conversion unit to a second plurality of outputs, wherein each of the second plurality of outputs comprise a single output cable, the conversion unit further receiving additional signals, comprising off-air television signals and internet signals, and the conversion unit and distribution unit are mounted in a cabinet in the MDU separate from any customer units in the MDU.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, there are three orbital slots, each comprising one or more satellites, delivering direct-broadcast television programming signals. However, ground systems that currently receive these signals cannot accommodate additional satellite signals, and cannot process the additional signals that will be used to transmit high-definition television (HDTV) signals. The HDTV signals can be broadcast from the existing satellite constellation, or broadcast from the additional satellite(s) that will be placed in geosynchronous orbit. The orbital locations of the satellites are fixed by regulation as being separated by nine degrees, so, for example, there is a satellite at 101 degrees West Longitude (WL), SatA 102; another satellite at 110 degrees WL, SatC 106; and another satellite at 119 degrees WL, SatB 104. Other satellites may be at other orbital slots, e.g., 72.5 degrees, 95, degrees, 99 degrees, and 103 degrees, and other orbital slots, without departing from the scope of the present invention. The satellites are typically referred to by their orbital location, e.g., SatA 102, the satellite at 101 WL, is typically referred to as "101." Additional orbital slots, with one or more satellites per slot, are presently contemplated.

The present invention allows currently installed systems to continue receiving currently broadcast satellite signals, as well as allowing for expansion of additional signal reception and usage. Further, the present invention allows for the use of pre-existing cabling within a given MDU such that the signal distribution within an MDU can be done without large new cable runs from the external antenna to individual set-top boxes.

Overview

The system of the present invention operates by band stacking signals on to a single satellite grade (e.g., RG6 type coaxial) cable, such that all currently operational satellite broadcasts are supported. The stacked signals reside in a frequency band that ranges from 2-3500 MHz, and these signals are transmitted from a distribution lock-box to each apartment using a single cable.

The system of the present invention is designed to auto-compensate for signal attenuation as a function of frequency and cable loss within the distribution system. The system is compatible with off-air VHF and UHF frequency bands to support NTSC and ATSC services. Additionally this system provides a 2-way signaling solution to enable broadband data services to co-exist on the common cable. As such, each user receives a standard satellite signal to each receiver. This architecture allows all satellite receivers, past or present, to operate with this system.

System Diagram

Figure 1A:
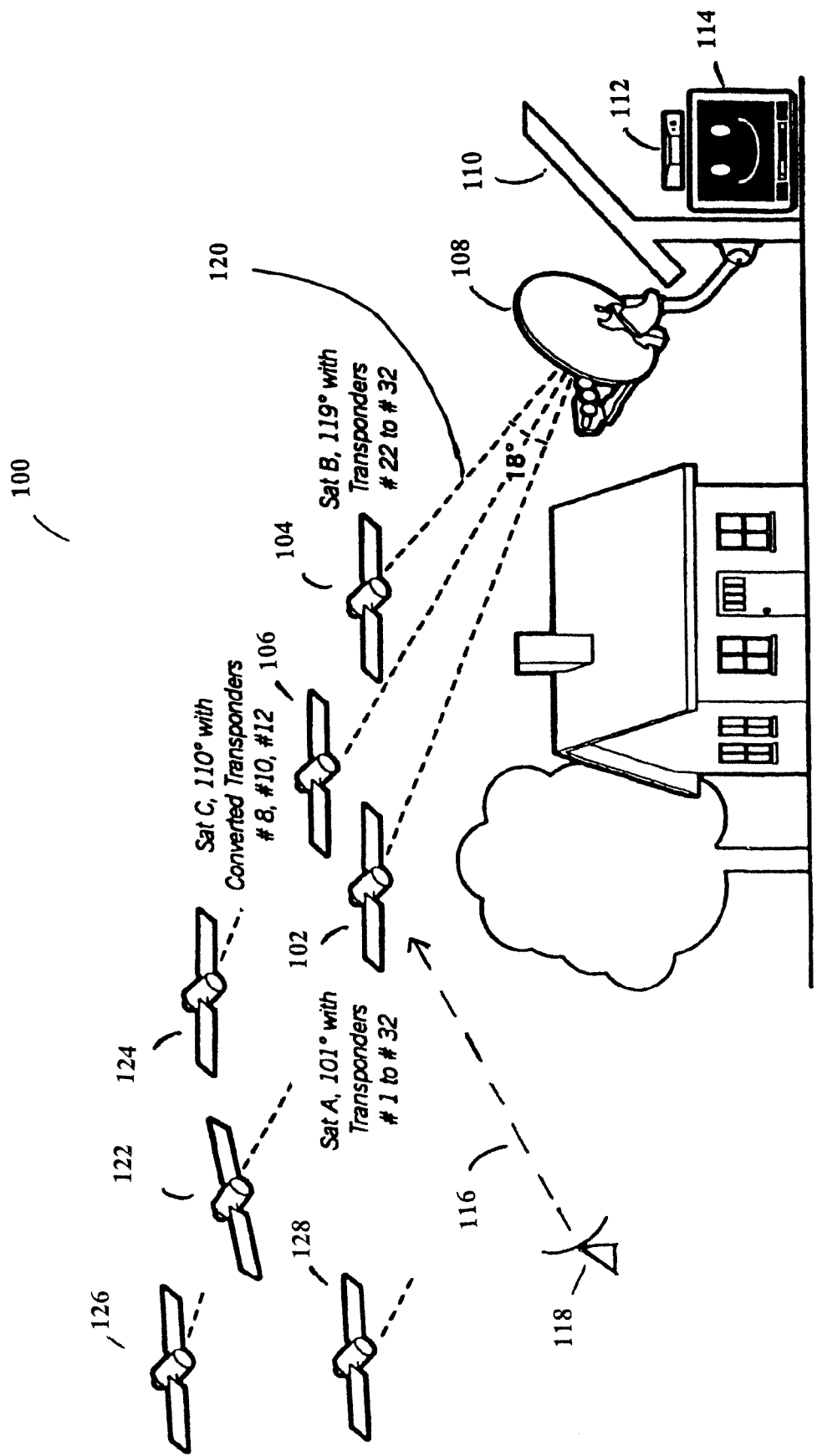
FIG. 1A illustrates a typical satellite television installation of the related art.
Figure 1B:
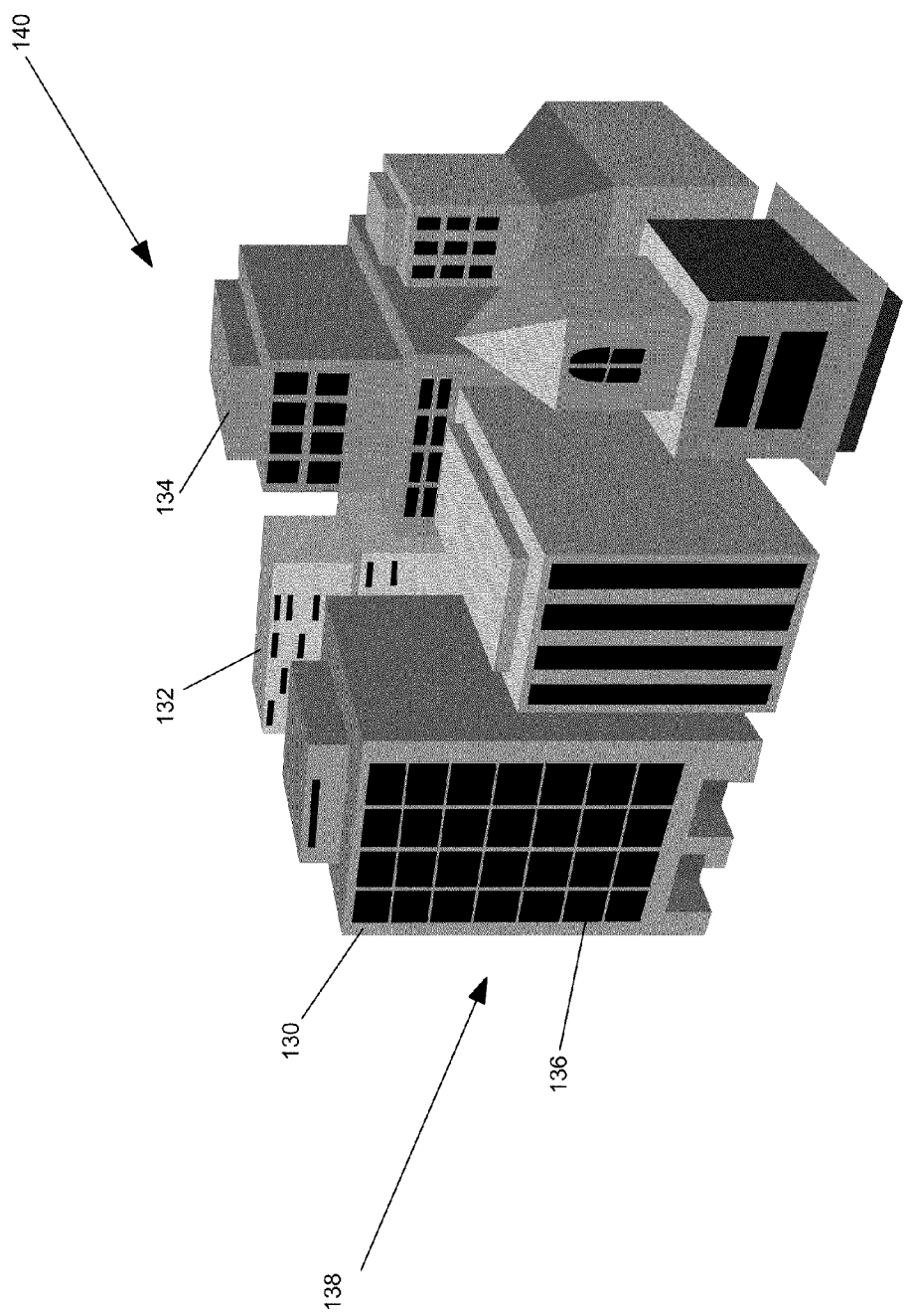
FIG. 1B illustrates a multiple dwelling unit in a typical urban setting.
Figure 2:
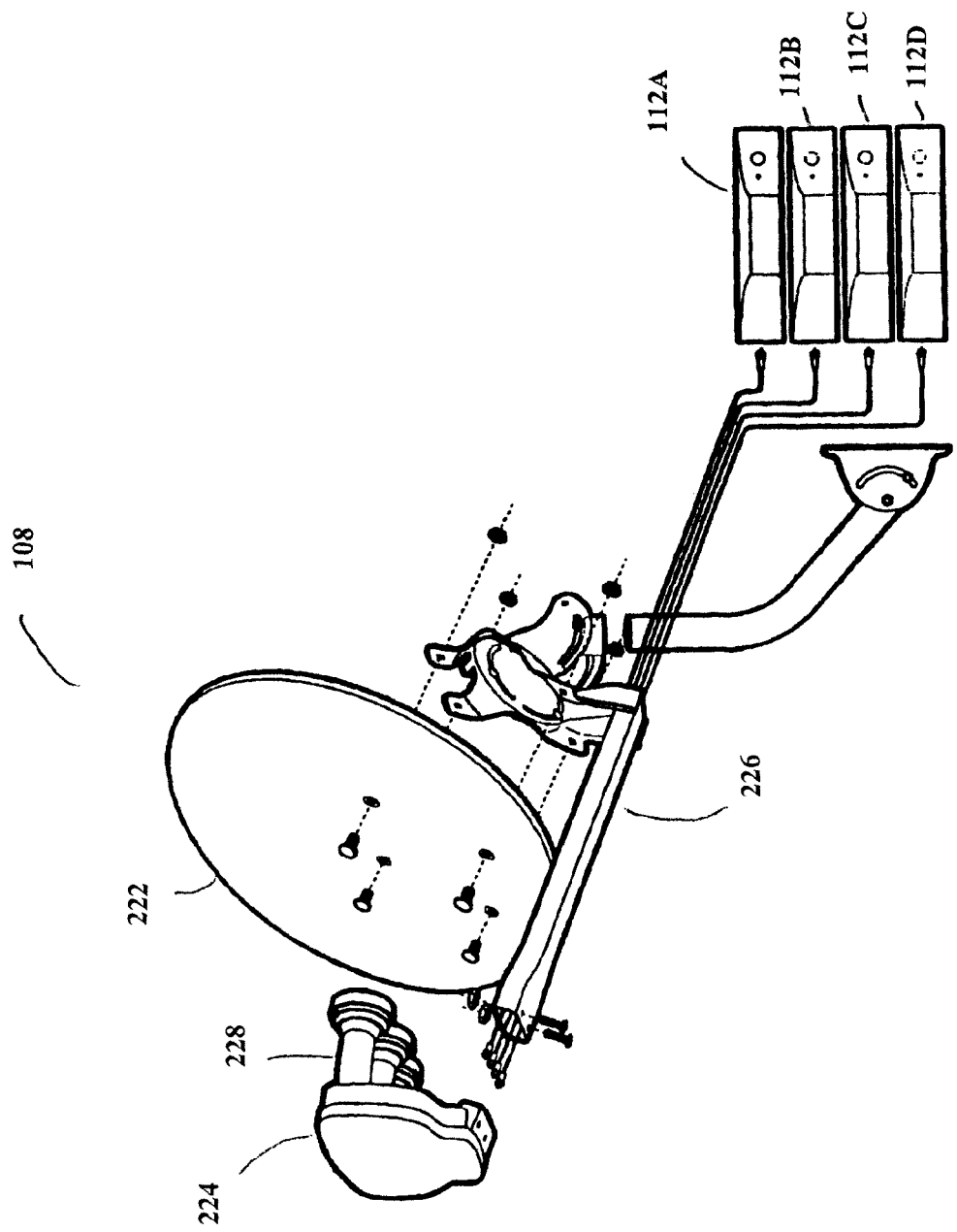
FIG. 2 illustrates a typical ODU of the related art.
Figure 3:
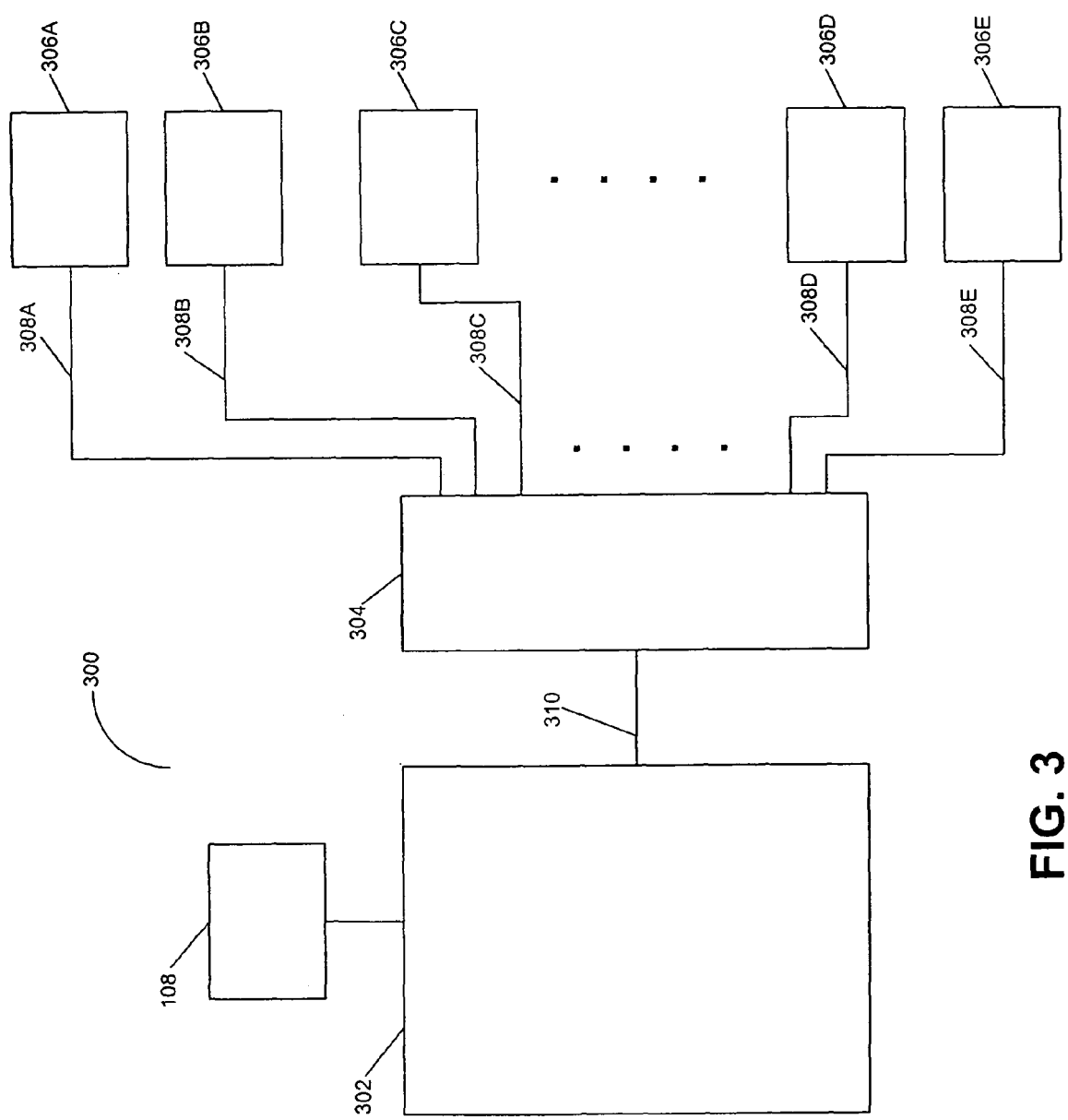
FIG. 3 illustrates a system diagram of the present invention.

FIG. 3 illustrates a system diagram of the present invention.

System 300 comprises ODU 108 as previously described, conversion unit 302, distribution panel 304, and customer unit's 306A-E (e.g., individual apartments in an apartment building, condominiums in a condominium community, etc.). Conversion unit 302 accepts the signals from ODU 108, and processes these signals for distribution via distribution unit 304. Each customer unit 306A-E is then coupled via cables 308A-E (collectively referred to as cables 308) to distribution unit 304. Cable 310 couples the conversion unit 302 to distribution panel 304.

Although five customer units 306A-E are shown, any number of customer unit's 306A-E are possible with the present invention. Since each customer unit 306A-E uses a single cable 308A-E to connect to the distribution panel 304, distribution panel 304 and, if necessary, additional conversion units 302 can be installed at a single location in an MDU and connections to individual customer unit's 306A-E can be arranged. Further, the installation of cables 308A-E can be done at the time of construction of customer units 306A-E (e.g., at the time the apartment building, condominium project, etc. is being built), such that retrofitting of customer units 306A-E is not necessary. Specific examples of different types of distribution panels 304 and cascaded connections of conversion units 302 are provided herein, however, the present invention is not to be limited to these specific examples.

Conversion Unit (Frequency Translation Module)

Figure 4:
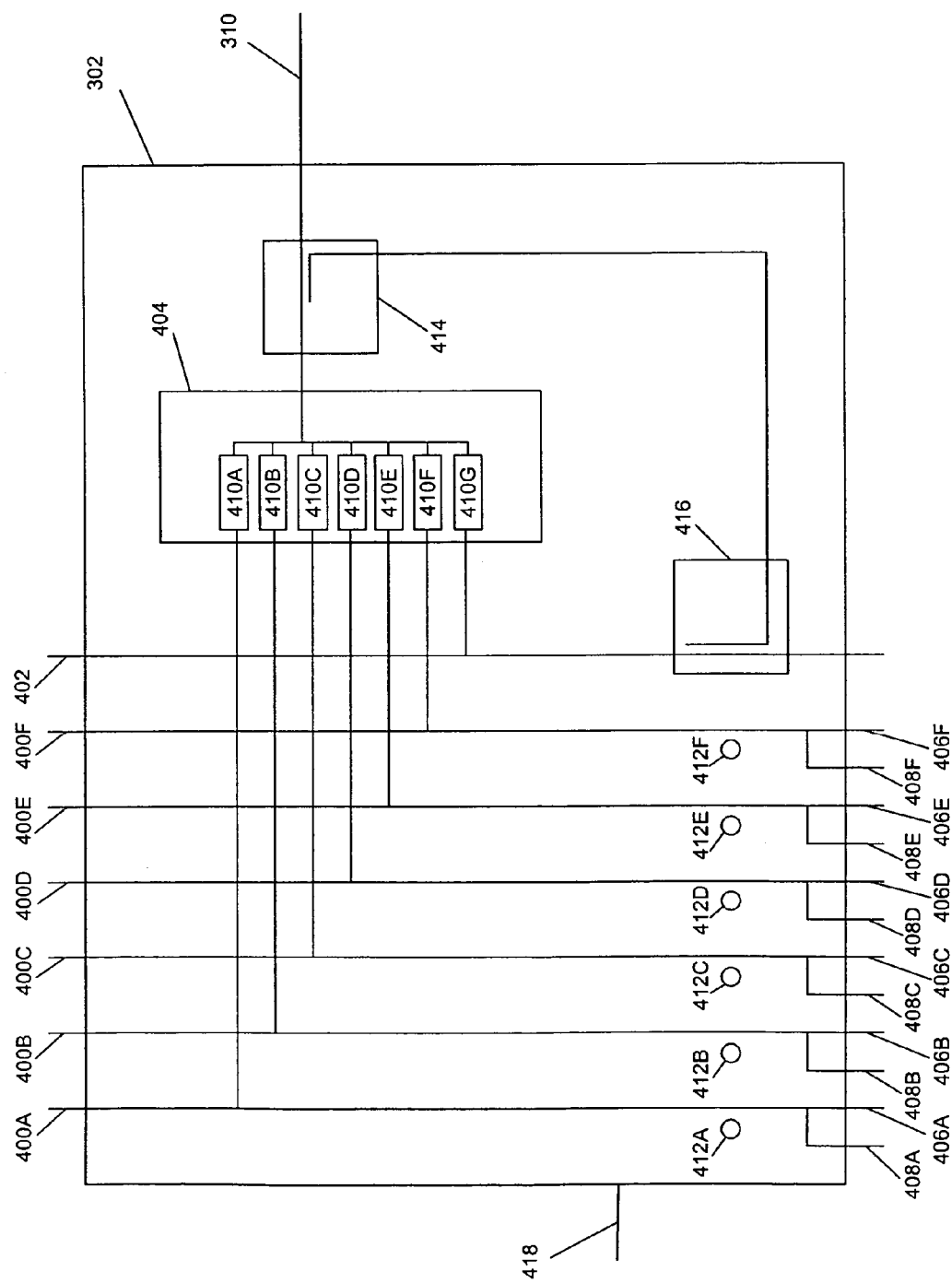
FIG. 4 is a detailed block diagram of the conversion unit of the present invention.

FIG. 4 is a detailed block diagram of the conversion unit of the present invention.

Conversion unit 302 comprises inputs 400A-400F for receiving satellite signals from the various satellites in system 100. Input 402 is for an off-air antenna such that terrestrial or cable signals can also be delivered to various dwelling units 306 via the system of the present invention.

Combiner 404 combines signals present in inputs 400A-400F and, if present, signals present on input 402. Further, any signals present on inputs 400A-400F are fed through conversion unit 302 to outputs 406A-406F respectively, and each output 406A-406F has a separate respective output 408A-408F.

Within combiner 404, Automatic Gain Control (AGC) circuitry 410A-410G automatically adjusts the signal levels of incoming signals on lines 400A-F and 402 to provide a uniform signal strength for all of these signals on output 310. The output 310 is set to a level based on indicators 412A-F, which are typically Light Emitting Diodes. Indicators 412A-F have three different states that indicate the signal present on the representative input 400A-F is either too high of a signal strength, too small of a signal strength, or within predetermined limits of signal strength. Installers of conversion unit 302 are instructed to adjust external amplifiers (not shown) to amplify signals present on inputs 400A-F to have the indicators 412A-F read too high of a signal strength, and reduce the amplifier gain until the respective indicator 418A-F shows that the respective signal is within the predetermined limit range.

Further, conversion unit optionally comprises a power divider 414 and a diplexer 416, to allow for signal injection from the output of combiner 404 back to input 402 via diplexer 416. This allows for data transfer and data services to dwelling units 306 within the system of the present invention.

Outputs 406A-406F and 407 are used to cascade multiple conversion units 302 in series to be able to service additional dwelling units 306 within a MDU. Further, outputs 408A-408F can be connected to a Frequency Translation Module (FTM) which allows for additional types of IRDs 112 to be used within a dwelling unit 306. Power input 418 provides power, either in AC or DC format, to conversion unit 302. Outputs 406A-406F, when cascaded to another conversion unit 302, also allow for power to be provided to a given conversion unit 302 when the power at input 418 fails, to prevent loss of signal delivery from output 310 of the conversion unit that has lost power at input 418.

The AGC circuits 410A-G allow the output 310 to be deterministic, such that a large number of dwelling units 306 can be serviced by a single conversion unit, and, if there are a larger number of dwelling units 306, or longer cable runs that will be connected to output 310 that would be effectively a larger number of dwelling units 306, then installers of conversion unit 302 know to put another conversion unit 302, or multiple conversion units 302, in cascade to complete a proper installation. So, for example, and not by way of limitation, the AGC circuits 410A-G can provide enough gain to the signals present on inputs 400A-F and 402 to a given number of dwelling units 306 (which are determined by distribution units 304), and, once that number is exceeded, installers will install a second conversion unit 302 in cascade by connecting to outputs 406A-F which, once indicators 412A-F are properly adjusted on the first conversion unit 302 in the cascade, will deliver proper signal levels to the cascaded conversion units 302. Typically, each conversion unit 302 can service up to sixty-four dwelling units 306, but larger or smaller numbers of dwelling units 306 can be serviced depending on the design of the MDU and the design of the conversion unit 302.

Distribution Unit

Figure 5A:
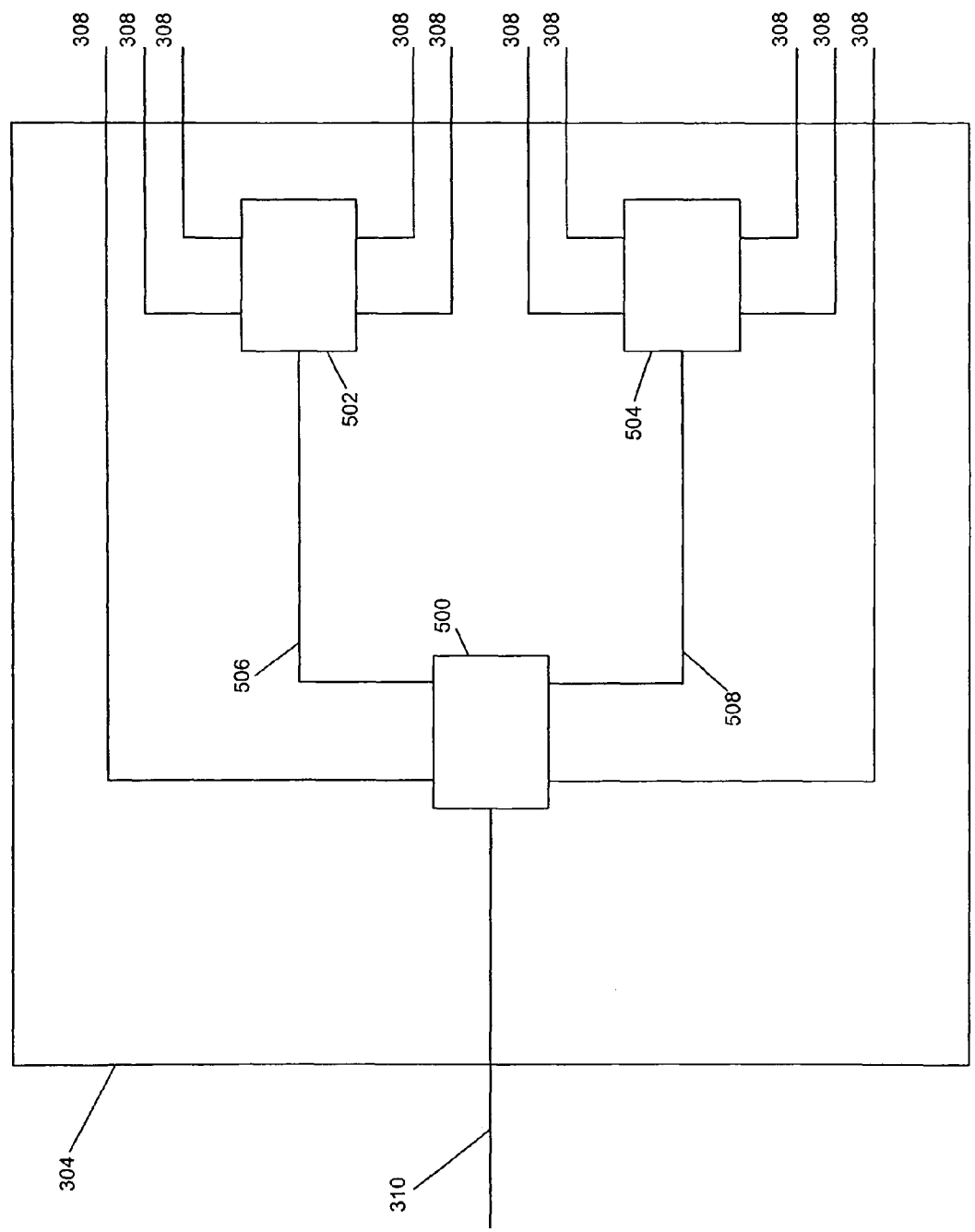
FIGS. 5A-5C illustrate typical distribution units in accordance with the present invention.
Figure 5B:
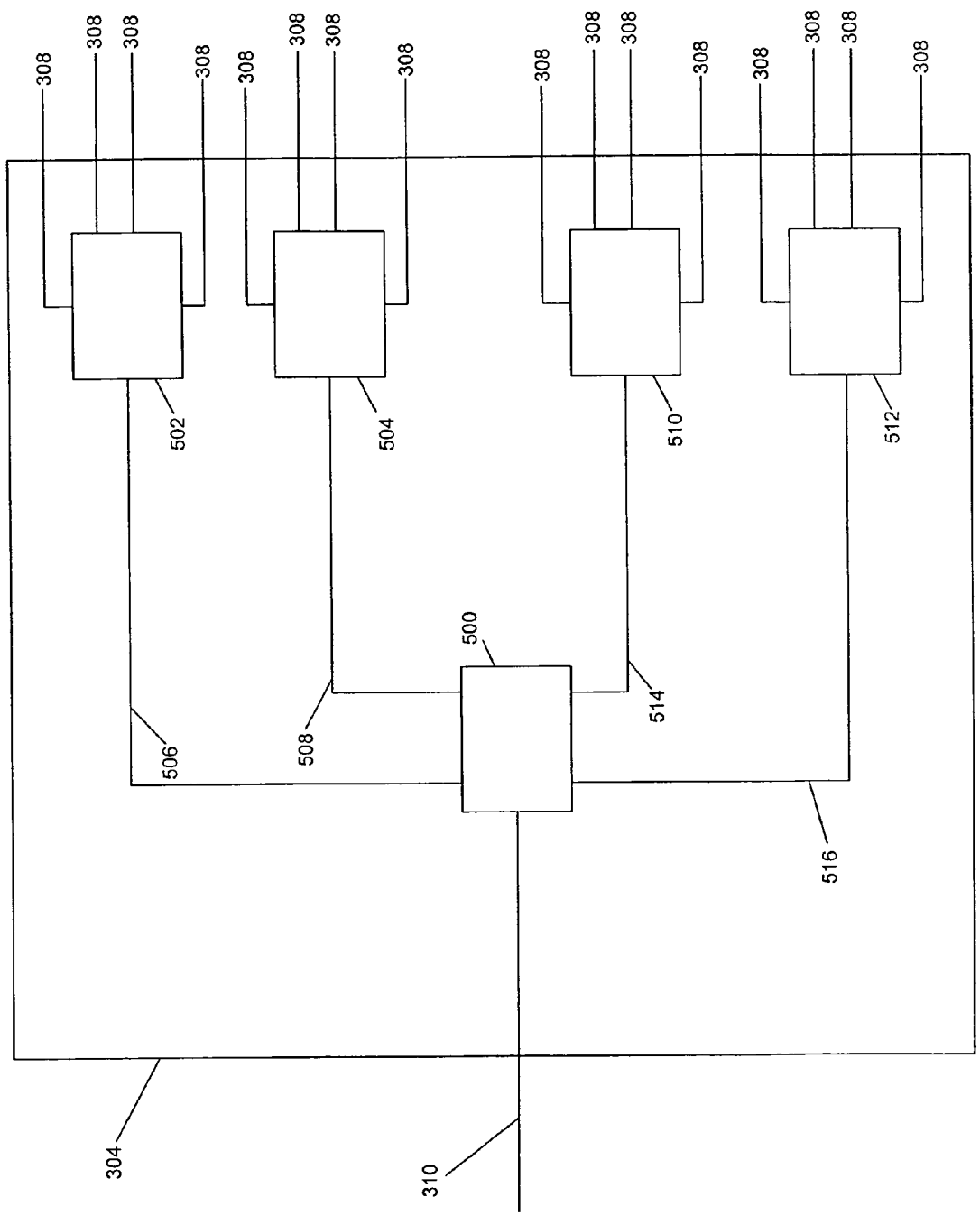
Figure 5C:
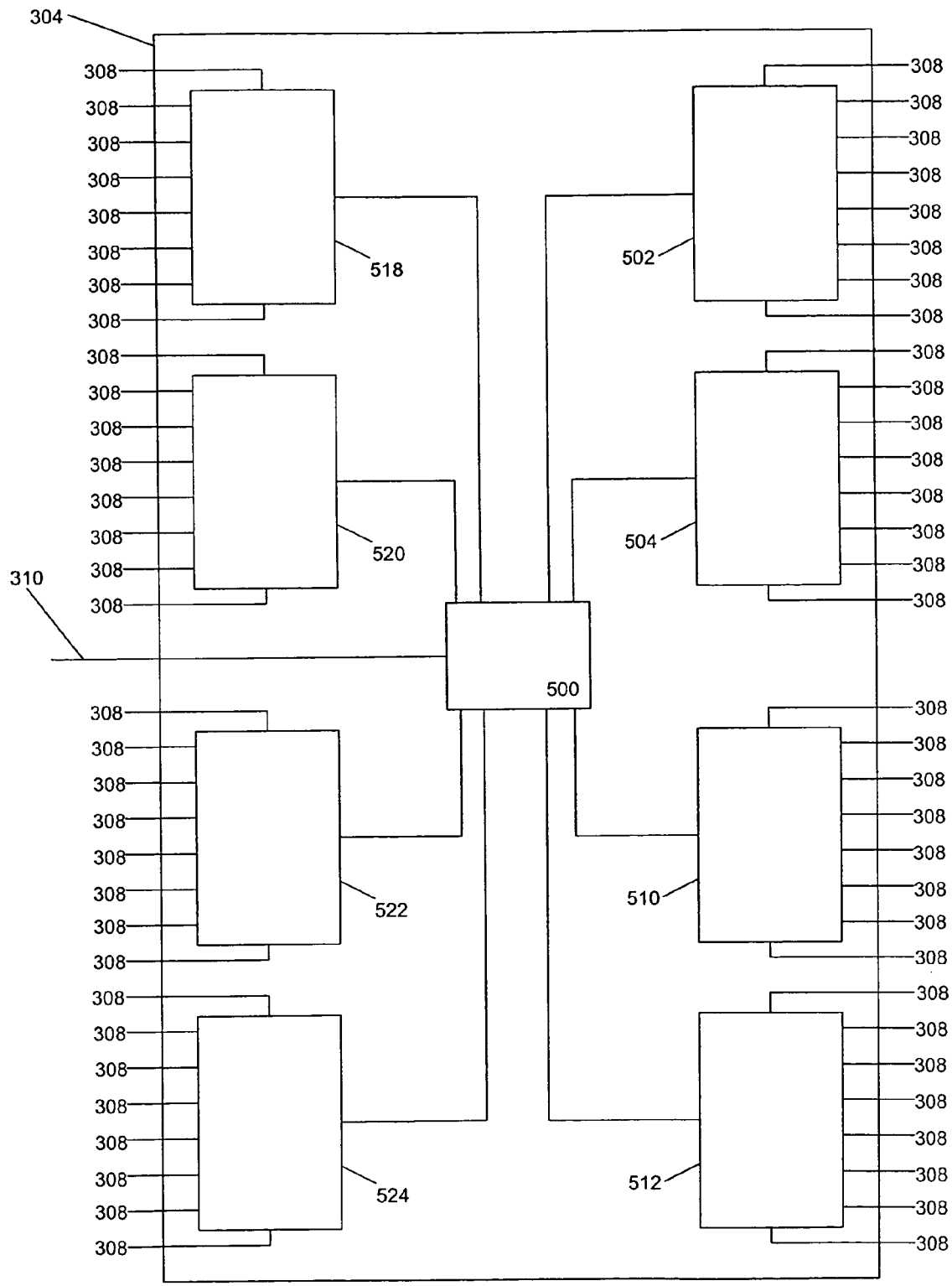

FIGS. 5A-5C illustrate typical distribution units in accordance with the present invention.

FIG. 5A illustrates a 10-unit configuration for system 300, wherein distribution unit 304 comprises ten outputs to ten different customer units 306. Signal splitters 500, 502, and 504 are shown where signal splitter 500 receives the signal from cable 310. Signal splitter 500 then splits this signal and provides two outputs directly to customer units on cables 308, and on cable 506 provides the signal to signal splitter 502, and on cable 508 provides the signal to signal splitter 504.

FIG. 5B illustrates a 16-unit configuration for system 300, wherein distribution unit 304 comprises sixteen outputs to sixteen different customer units 306. Signal splitters 500, 502, 504, 510, and 512 are shown where signal splitter 500 receives the signal from cable 310. Signal splitter 500 then splits this signal and provides outputs on cable 506 to signal splitter 502, on cable 508 to signal splitter 504, on cable 514 to signal splitter 510, on cable 516 to signal splitter 512. Signal splitters 502, 504, 510, and 512 then provide the outputs on cables 308 directly to customer units 306.

FIG. 5C illustrates a 64-unit configuration for system 300, wherein distribution unit 304 comprises sixty-four outputs to sixty-four different customer units 306. Signal splitters 500, 502, 504, 510, 512, 518, 520, 522, and 524 are shown where signal splitter 500 receives the signal from cable 310. Signal splitter 500 then splits this signal and provides outputs to signal splitters 502, 504, 510, 512, 518, 520, 522, and 524 Signal splitters 502, 504, 510, 512, 518, 520, 522, and 524 then provide the outputs on cables 308 directly to customer units 306.

As can be seen from FIGS. 5A-C, many different configurations for distribution unit 304 are possible within the scope of the present invention. Signal splitters 500, 504, 510, 512, 518, 522, and 524 can be splitters that split signal 310 into four signals, eight signals, or can further divide signal 310 as desired without departing from the scope of the present invention.

Customer Unit

FIGS. 6A-6D illustrates typical customer unit installations in accordance with the present invention.

Figure 6A:
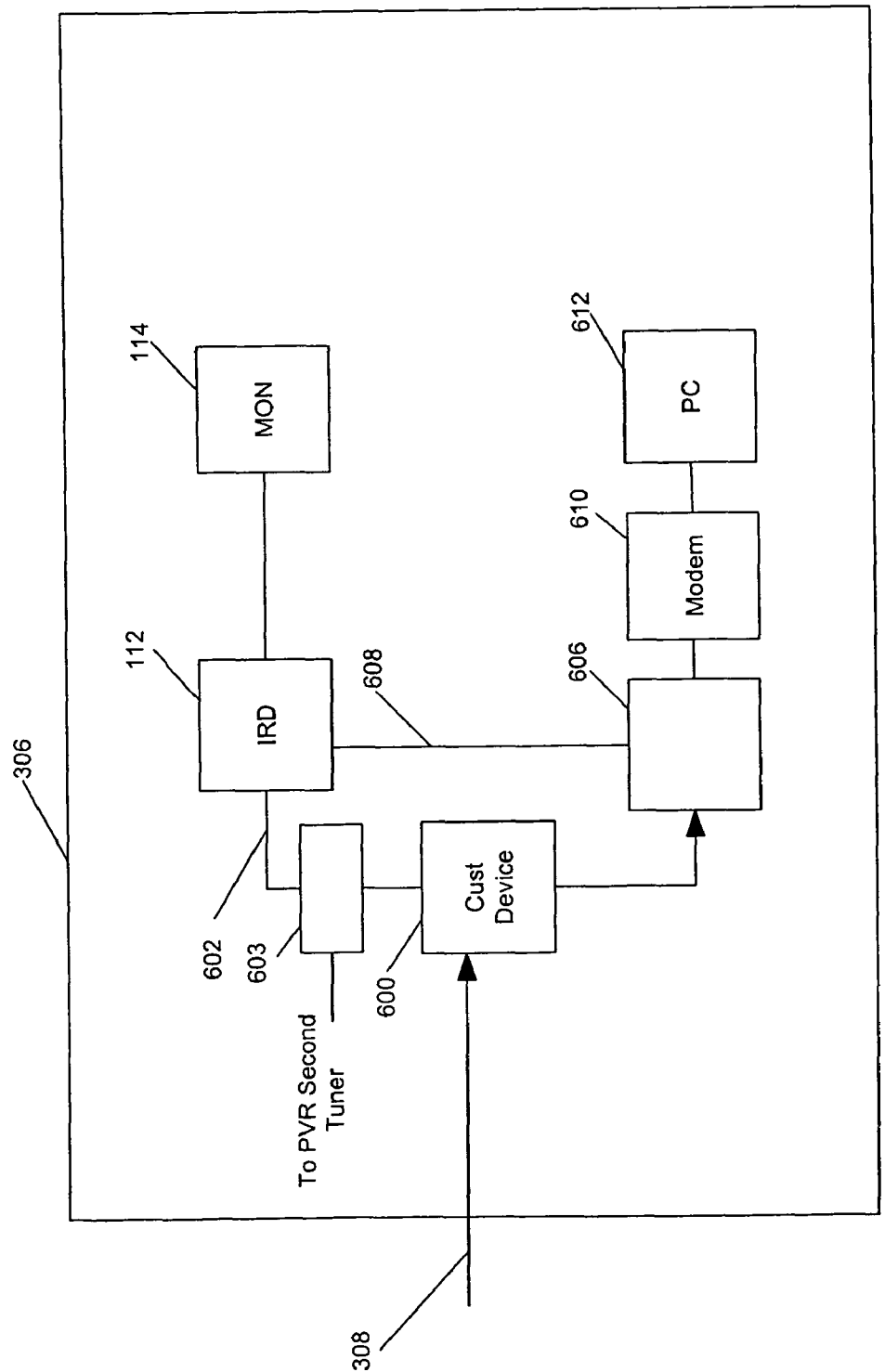
FIGS. 6A-6D illustrates typical customer unit installations in accordance with the present invention.

FIG. 6A illustrates a typical customer unit 306, with cable 308 entering customer unit 306. Customer device 600 accepts cable 308, which contains the stacked signal from conversion unit 302 via distribution unit 304. The output 602, which is "destacked" to a typical 500 MHz signal recognizable and decodable by an Integrated Receiver/Decoder (IRD) 112, is sent to such an IRD 112, and can be split via a splitter 603 to service a Personal Video Recorder (PVR) if desired, while output 604 can be delivered to a summation box 606. Summation box 606 removes any "off-air" signals and delivers them to IRD 112 via cable 608. Summation box 606 can also deliver internet signals, or off-air television signals, or, if desired, satellite television signals to modem 610, which then selectively delivers these signals to a computer 612. IRD 112 selectively delivers signals to monitor 114 for viewing by a user.

Figure 6B:
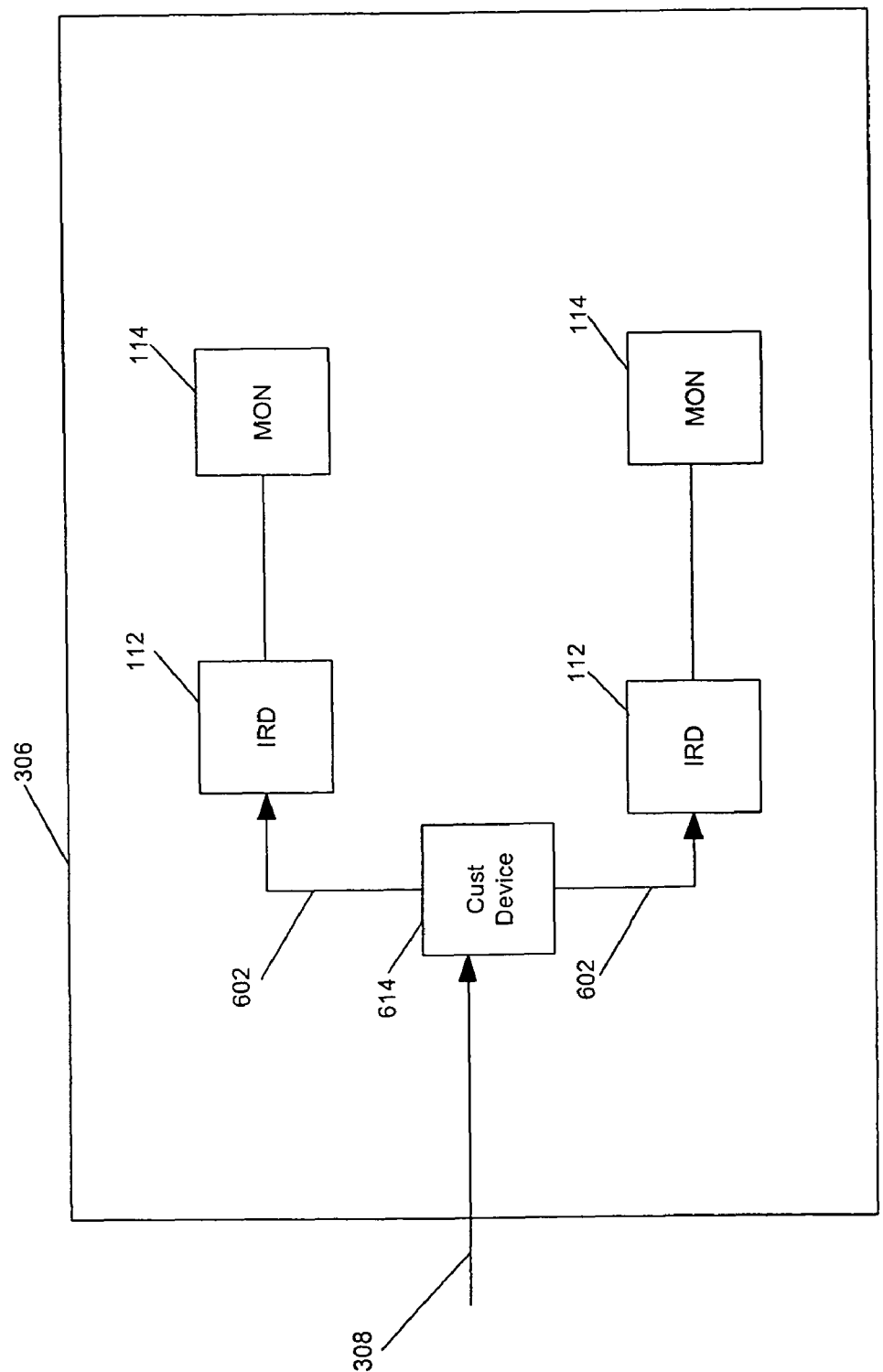
Figure 6C:
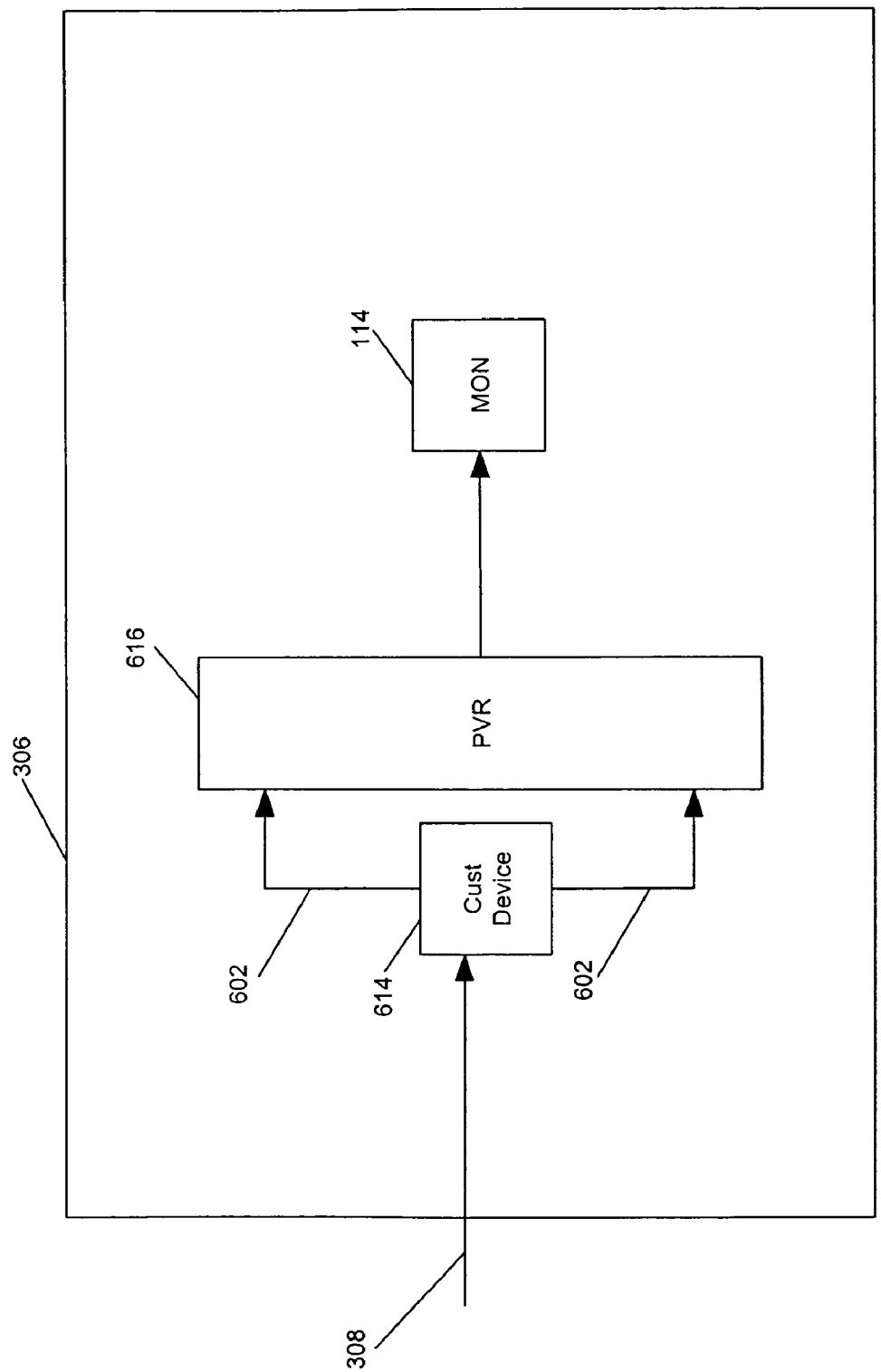

FIG. 6B illustrates a customer unit 306 with a dual port customer device 614. The customer device 614 can deliver two signals 602, which can be delivered to two IRDs 112 or, as shown in FIG. 6C, a Personal Video Recorder (PVR) 616.

Figure 6D:
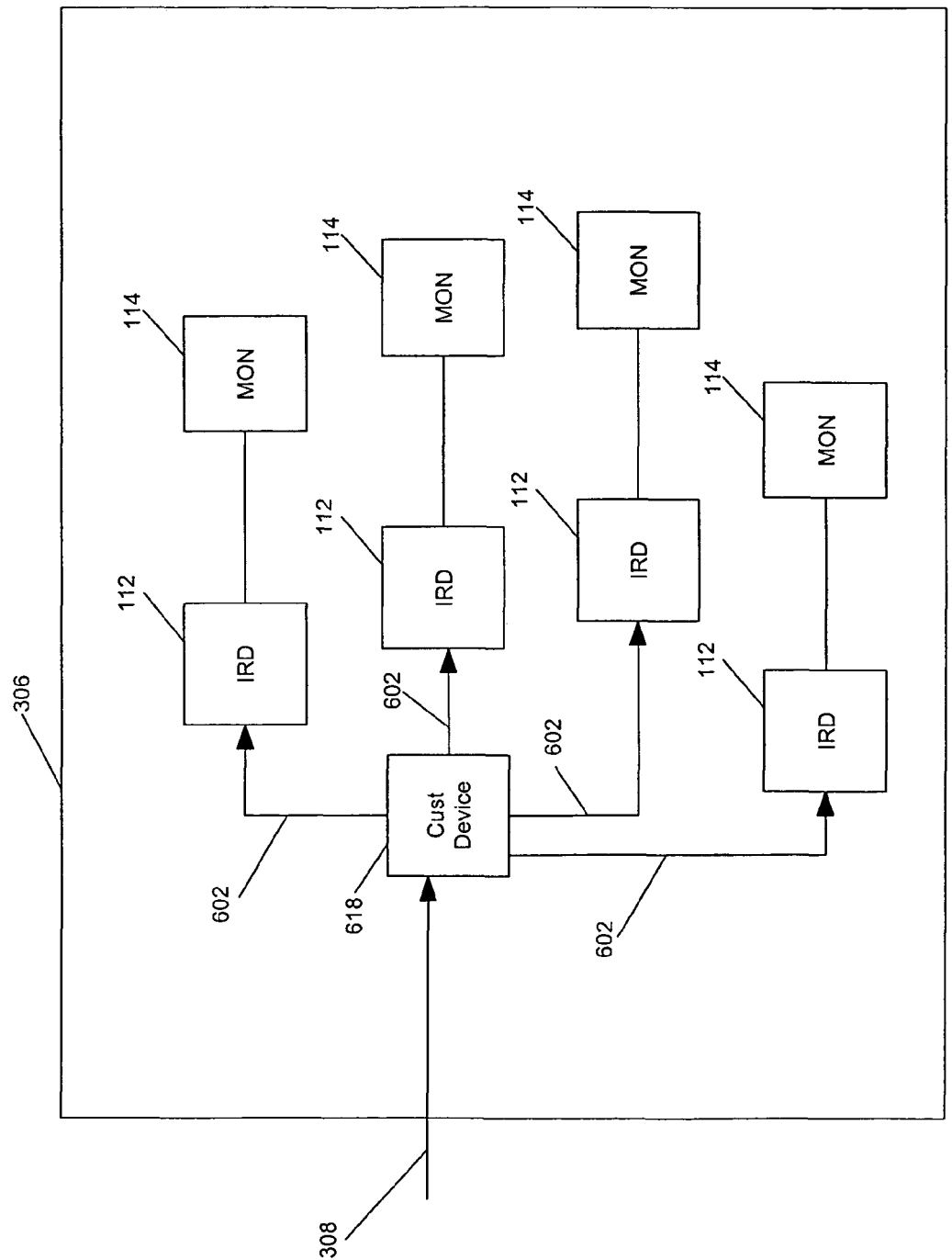

FIG. 6D illustrates a four-port customer device 618. The customer device 618 can deliver four signals, which can be delivered to four IRDs 112 as shown, or, if desired, two of the ports of customer unit 618 can be connected to a PVR 616.

Cascaded Conversion Units

Figure 7:
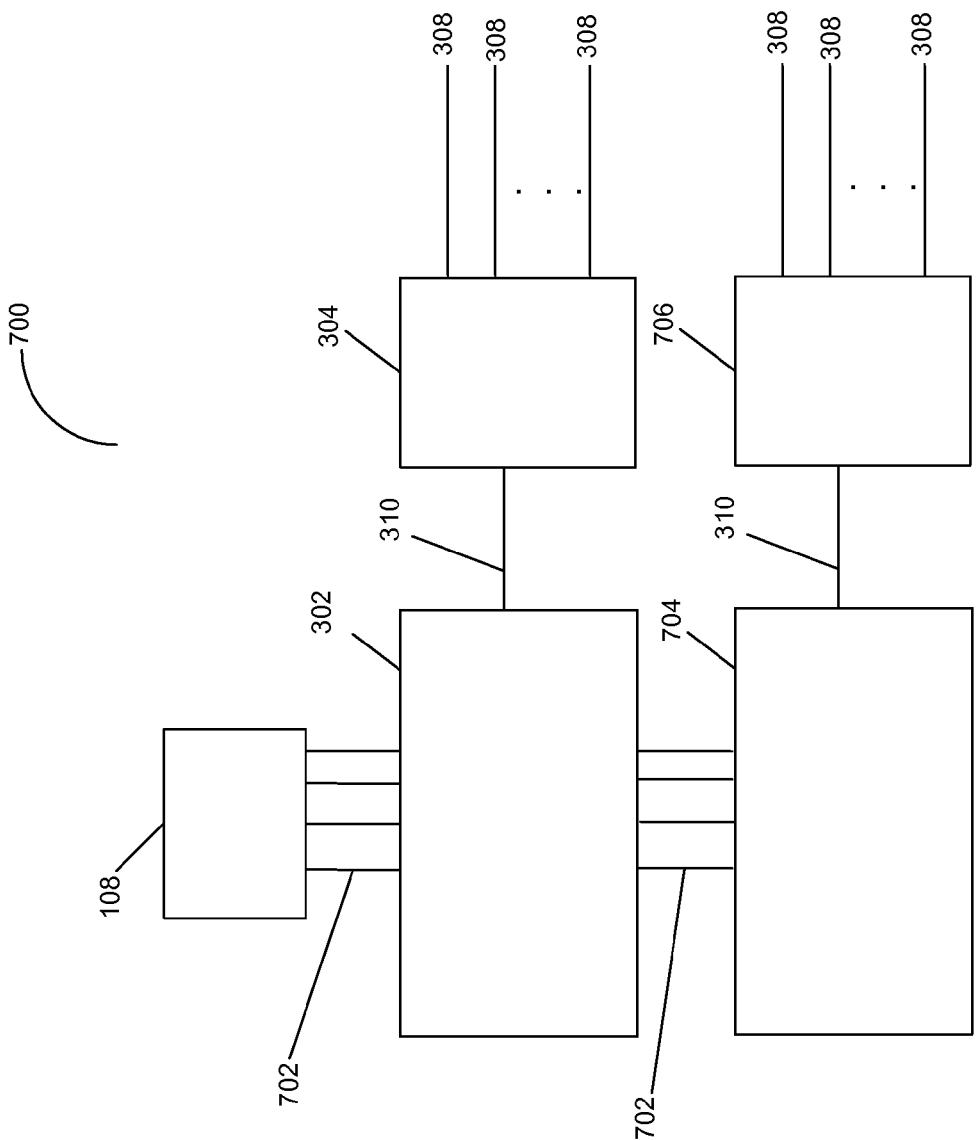
FIG. 7 illustrates cascaded conversion units in accordance with the present invention.

FIG. 7 illustrates cascaded conversion units in accordance with the present invention. Conversion units 302 can be connected together in a cascaded fashion to service additional customer units 306. Because of losses in signal strength along cables 308, and losses because of splitting the signal in distribution unit 304, each conversion unit 302 has a maximum number of customer units 306 that it can service adequately. Line amplifiers can be added to cables 308, or inside of distribution unit 304, however, these lead to noise problems for the signal on cables 308, as well as possible problems in controlling the signal on cable 308 from the individual IRDs 112 in each customer unit 306.

As such, the present invention allows for connection of additional customer units 306 as shown in FIG. 7.

In system 700, ODU 108 is typically coupled to conversion unit 304 via cables 702. These cables deliver the signals from LNBs 128 to conversion unit 302. Conversion unit 302 has a "pass through" feature which splits these signals immediately after reception such that the signals on cables 702 can be forwarded to another conversion unit 704 (which is substantially identical to conversion unit 304, but is given a different reference numeral for clarity). Conversion unit 302 is connected to distribution unit 304, and conversion unit 704 is coupled to a different distribution unit 706. Distribution units 304 and 706 may have a different number of outputs 308 for delivery to customer units 306, or the MDU 110 that system 700 is installed in may have more customer units 306 than a single conversion unit 302 can adequately service. Although only two conversion units 304 and 706 are shown, any number of conversion units 304 and 706 may be cascaded together without departing from the scope of the present invention.

Such systems 300 and 700 provide for a single installation of an ODU 108, in a preferred location, such that ODU 108 can receive signals from satellites 102-106. The cables 702 from ODU 108 can then be installed to a centralized location, where conversion unit 302, and, if desired, additional conversion units 704 are located, along with distribution units 304 and 706. Each customer unit 306 is then wired to the distribution units 304, 706 with a single cable 308.

Such systems 300 and 700 make it possible to deliver satellite, cable, and off-air television signals to customer units 306 regardless of customer unit 306 location, and makes installation of systems 300 and 700 easier.

CONCLUSION

In summary, the present invention comprises systems for delivering satellite signals to multiple dwelling units (MDUs). A system in accordance with the present invention comprises an antenna for receiving the satellite signals, a conversion unit, coupled to the antenna, for stacking the satellite signals onto a single cable, a distribution unit, coupled to the conversion unit, wherein the distribution unit distributes the stacked satellite signal to a plurality of outputs, and at least one customer device, coupled to an output of the plurality of outputs, wherein each unit in the MDU uses the customer device to destack the stacked satellite signals for delivery to a receiver.

Such a system optionally also comprises the at least one customer device selectively delivers the destacked satellite signal to a plurality of receivers within the MDU, a second conversion unit, coupled to the conversion unit, and a second distribution unit, coupled to the second conversion unit, wherein the second conversion unit stacks the satellite signals, and the second distribution unit provide the satellite signals stacked by the second conversion unit to a second plurality of outputs, the conversion unit further receiving additional signals, comprising off-air television signals and internet signals.

An alternative system in accordance with the present invention comprises an antenna for receiving the satellite signals, a conversion unit, coupled to the antenna, for stacking the received satellite signals onto a single cable, a distribution unit, coupled to the conversion unit, wherein the distribution unit distributes the stacked satellite signal to a plurality of outputs, each of the plurality of outputs comprising a single output cable, a plurality of customer devices, wherein the customer devices are coupled to the plurality of single output cables in a respective manner, wherein the customer devices destack the stacked satellite signals, and a receiver, coupled to the customer device, for decoding the destacked satellite signals.

Such a system optionally includes the customer device selectively delivering the destacked satellite signal to a plurality of receivers within the MDU based on commands received from the receiver, a second conversion unit, coupled to the conversion unit, and a second distribution unit, coupled to the second conversion unit, the second conversion unit stacking the satellite signals, and the second distribution unit provide the satellite signals stacked by the second conversion unit to a second plurality of outputs, wherein each of the second plurality of outputs comprise a single output cable, the conversion unit further receiving additional signals, comprising off-air television signals and internet signals, and the conversion unit and distribution unit are mounted in a cabinet in the MDU separate from any customer units in the MDU.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for delivering satellite signals to multiple dwelling units (MDUs), comprising:
    an antenna for receiving the satellite signals;
    a conversion unit, coupled to the antenna, for stacking the satellite signals onto a single cable, wherein the conversion unit comprises a combiner, the combiner including gain control circuitry to separately adjust each of the satellite signals to a uniform signal strength as determined at the output of the conversion unit;
    a distribution unit, coupled directly to the output of the conversion unit, wherein the distribution unit distributes the stacked satellite signal to a plurality of outputs; and
    at least one customer device, coupled to an output of the plurality of outputs, wherein each unit in the MDU uses the customer device to destack the stacked satellite signals for delivery to a receiver.

2. The system of claim 1, wherein the at least one customer device selectively delivers the destacked satellite signal to a plurality of receivers within the MDU.

3. The system of claim 1, further comprising a second conversion unit, coupled to the conversion unit, and a second distribution unit, coupled to the second conversion unit.

4. The system of claim 3, wherein the second conversion unit stacks the satellite signals and the second distribution unit provide the satellite signals stacked by the second conversion unit to a second plurality of outputs.

5. The system of claim 1, wherein the conversion unit further receives additional signals.

6. The system of claim 5, wherein the additional signals comprise off-air television signals.

7. The system of claim 6, wherein the additional signals further comprise Internet signals.

8. A system for delivering satellite signals to a Multiple Dwelling Unit (MDU), comprising:
    an antenna for receiving the satellite signals;
    a conversion unit, coupled to the antenna, for stacking the received satellite signals onto a single cable, wherein the conversion unit comprises a combiner, the combiner including gain control circuitry to separately adjust each of the satellite signals to a signal strength as determined at an output of the conversion unit;
    a distribution unit, coupled directly to the output of the conversion unit, wherein the distribution unit distributes the stacked satellite signal to a plurality of outputs, each of the plurality of outputs comprising a single output cable;
    a plurality of customer devices, wherein the customer devices are coupled to the plurality of single output cables in a respective manner, wherein the customer devices destack the stacked satellite signals; and
    a receiver, coupled to the customer device, for decoding the destacked satellite signals.

9. The system of claim 8, wherein the customer device selectively delivers the destacked satellite signal to a plurality of receivers within the MDU based on commands received from the receiver.

10. The system of claim 8, further comprising a second conversion unit, coupled to the conversion unit, and a second distribution unit, coupled to the second conversion unit.

11. The system of claim 10, wherein the second conversion unit stacks the satellite signals, and the second distribution unit provide the satellite signals stacked by the second conversion unit to a second plurality of outputs, wherein each of the second plurality of outputs comprise a single output cable.

12. The system of claim 8, wherein the conversion unit further receives additional signals.

13. The system of claim 12, wherein the additional signals comprise off-air television signals.

14. The system of claim 13, wherein the additional signals further comprise internet signals.

15. The system of claim 8, wherein the conversion unit and distribution unit are mounted in a cabinet in the MDU separate from any customer units in the MDU.

* * * * *